US006974952B2

(12) United States Patent
Morooka et al.

(10) Patent No.: US 6,974,952 B2
(45) Date of Patent: Dec. 13, 2005

(54) RADIATION DETECTOR

(75) Inventors: Toshimitsu Morooka, Chiba (JP); Keiichi Tanaka, Chiba (JP); Atsushi Nagata, Chiba (JP); Kazuo Chinone, Chiba (JP); Tatsuji Ishikawa, Chiba (JP)

(73) Assignee: SII NanoTechnology Inc., Chiba (JP)

( * ) Notice: Subject to any disclaimer, the term of this patent is extended or adjusted under 35 U.S.C. 154(b) by 200 days.

(21) Appl. No.: 10/417,907

(22) Filed: Apr. 17, 2003

(65) Prior Publication Data

US 2004/0011960 A1 Jan. 22, 2004

(30) Foreign Application Priority Data

Apr. 19, 2002 (JP) ............................ 2002-117916

(51) Int. Cl.[7] ................................................ G01T 1/00
(52) U.S. Cl. .................................. 250/336.2; 374/176
(58) Field of Search .......................... 250/336.2, 336.1, 250/393, 394; 374/176; 324/248, 244, 260; 327/527; 257/34

(56) References Cited

U.S. PATENT DOCUMENTS 4,678,918 A 7/1987 Hermens .................... 250/374
4,734,988 A 4/1988 Steele et al. .................. 33/645
4,809,314 A 2/1989 Steele et al. ................ 378/205
4,982,096 A 1/1991 Fujii et al. .................. 250/367
5,641,961 A * 6/1997 Irwin et al. .............. 250/336.2
5,768,339 A * 6/1998 O'Hara ........................ 378/147
5,880,468 A * 3/1999 Irwin et al. .............. 250/336.2
6,211,519 B1 * 4/2001 Nam et al. ............... 250/336.2
6,239,431 B1 * 5/2001 Hilton et al. ............ 250/336.2
6,727,505 B2 * 4/2004 Benke et al. ............... 250/393
6,814,498 B2 * 11/2004 Kang et al. .................... 385/60
6,823,693 B1 * 11/2004 Hofmann et al. ............ 65/59.4

* cited by examiner

*Primary Examiner*—Otilia Gabor
(74) *Attorney, Agent, or Firm*—Adams & Wilks

(57) ABSTRACT

A radiation detector comprises an energy/electricity converter having a detection area for detecting incident radiation, and electrodes connecting the converter to an external driving circuit for driving the converter to convert energy of the incident radiation detected by the detection area of the converter into an electric signal. A collimator is integrally connected to the converter and has an opening for transmitting radiation to irradiate the detection area of the converter and portions for preventing radiation from irradiating a part of the converter other than the detection area. A spacer is integrally connected to the collimator and the converter for maintaining a preselected distance between the collimator and the detection area of the converter.

20 Claims, 7 Drawing Sheets

RADIATION DETECTOR

BACKGROUND OF THE INVENTION

1. Field of the Invention

The present invention relates to a radiation detector that reads out radiation energy as electric signals, and particularly relates to a highly practical radiation detector having a high energy resolution and a high detection efficiency.

2. Description of the Related Art

A radiation detector is a converter that converts radiation energy such as visible lights, infrared rays, ultraviolet rays, X-rays, gamma rays into electric signals. Radiation measurement requires a high energy resolution and a high detection efficiency. A high energy resolution means a small variation in signals obtained from radiation having a certain energy. A high detection efficiency means a high probability that the radiation is irradiated to the detection area of a detector and extracted as signals.

FIG. 13 shows a radiation measuring system using a radiation detector according to the related art. In FIG. 13, an entire board is shown as a radiation detector 21. The radiation detector 21 is connected to an external driving circuit 3 through wires 4 to extract the energy of radiation 1 as electric signals. The radiation detector 21 is provided with a detection area 22 to obtain electric signals when radiation is irradiated to this region. Further, to prevent radiation to a part other than the detection area 22, a collimator 23 having an opening diameter D is provided. The collimator 23 is supported with a distance H from the detection area 22 by a supporter independent from the radiation detector 21.

Signal waveforms obtained by the radiation detector depend on irradiation positions of radiation. The collimator shields irradiation to a part other than the detection area, thus being an effective part for restricting variation in electric signals by irradiation to a part other than the detection area. However, depending on the position relationship between the opening of the collimator and the detection area, irradiation may be shielded by the collimator as the radiation 1A, or may be aside from the detection area 22 as the radiation 1B. To irradiate more radiation to the detection area and obtain a higher detection efficiency, a larger solid angle, which is determined by the opening diameter and the distance between the opening and the detection area, is required. Further, the alignment accuracy of the opening and the detection area, and control of the distance therebetween are significant factors.

Radiation measurement requires a high energy resolution and a high detection efficiency. By installing a collimator to the detection area to narrow the irradiatable region, accurate irradiation to the detection area is achieved. In this case, however, the solid angle determined by the opening diameter of the collimator and the distance between the opening and the detection area is smaller, which causes a problem that a high detection efficiency cannot be obtained.

Further, the alignment accuracy of the opening of the collimator and the detection area is also a factor that restricts the detection efficiency. It is difficult to accurately align a collimator supported by an external supporter with the detection area and control the distance between them, and thus the detection efficiency has not been improved.

SUMMARY OF THE INVENTION

In the present invention, an opening for transmitting radiation to irradiate a detection area is provided, and a collimator that is a shielding plate for preventing radiation from irradiating a part other than the detection area is provided on the same board forming a radiation detector thereon. Thus, the alignment of the opening of the collimator and the detection area is made easier, and the detection efficiency is increased by arranging the detection area and the opening of the collimator closer to each other.

In making a radiation detector according to the invention, various methods including the following can be applied.

(1) A spacer is provided, between the board and the opening of the collimator to maintain a certain distance therebetween, fixing them by adhesive bonding.

(2) An energy/electricity converter is formed on a Si substrate, borosilicate glass is used for the spacer, another Si substrate is used as the collimator, the energy/electricity converter and the collimator sandwich the spacer of borosilicate glass therebetween, then a temperature and a load are applied thereto, and thus they are directly bonded by anodic bonding in which a positive potential is applied to Si material.

(3) A cavity that maintains a certain distance between the board and the opening is formed in the collimator, and they are fixed by adhesive bonding.

(4) An energy/electricity converter is formed on a Si substrate, borosilicate glass is used for the collimator, the energy/electricity converter and the collimator are laminated, then a temperature and a load are applied to them, and thus they are directly bonded by anodic bonding in which a positive potential is applied to the energy/electricity converter.

(5) A light transmitting material made mostly from glass, sapphire, and so on is used for the collimator.

(6) The collimator has a bilayer structure of two kinds of materials having different absorption coefficient s of radiation to be detected, wherein a material having a lower absorption coefficient is fixed on the board as a supporting member, and a material having a higher absorption coefficient is formed with the opening that transmits radiation. The collimator is fixed on the board to be the energy/electricity converter, and thereafter the opening is formed by focused ion beam (FIB) etching. The energy/electricity converter is a superconducting transition edge sensor (TES) that is formed on the board functioning as a heat sink, absorbs radiation and converts the radiation into heat, and then, measures a change in the temperature thereof to extract the radiation as an electric signal.

DETAIL DESCRIPTION OF THE PREFERRED EMBODIMENTS

Preferred embodiments according to the invention will be described below with reference to the accompanying drawings.

First Embodiment

Figure 1:
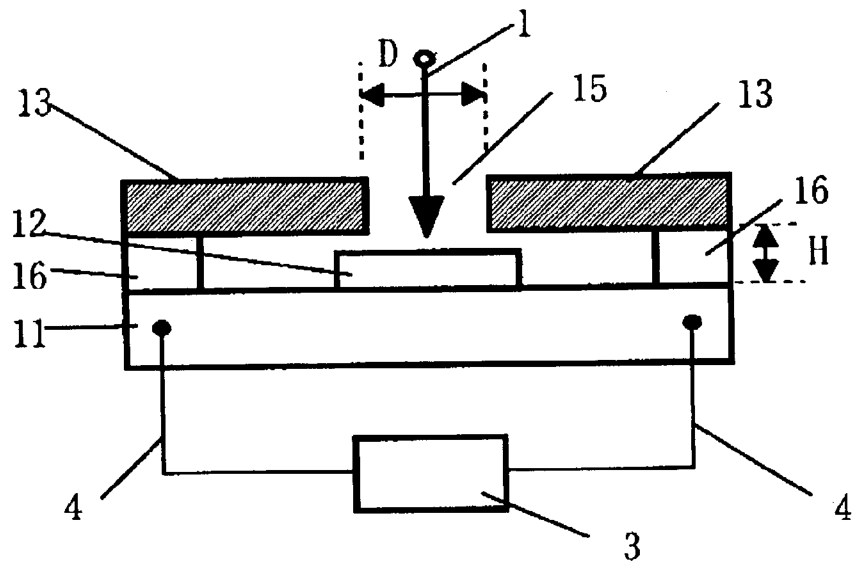
FIG. 1 is a block diagram showing a radiation measurement system using a radiation detector according to a first embodiment of the invention.

FIG. 1 shows a radiation measurement system using a radiation detector according to a first embodiment of the invention. A radiation detector is an energy/electricity converter that converts energy of incident radiation into an electric signal. In FIG. 1, an entire board 11 is shown as the radiation detector. The radiation detector 11 is connected to an external driving circuit 3 through wires 4 to be able to extract the energy of radiation 1 as an electric signal. The radiation detector 11 is provided with a detection area 12, thus obtaining an electric signal when radiation is irradiated to this region. To prevent radiation from irradiating a part other than the detection area 12, a collimator 13 having an opening diameter D is provided. The collimator 13 is arranged on the board 11, and the collimator 13 and the radiation detector 11 sandwiches a spacer 16 therebetween to maintain the distance H from the detection area 12. In this embodiment, the spacer 16 constitutes connecting means for integrally directly connecting the collimator 13 to the energy/electricity converter.

Figure 2:
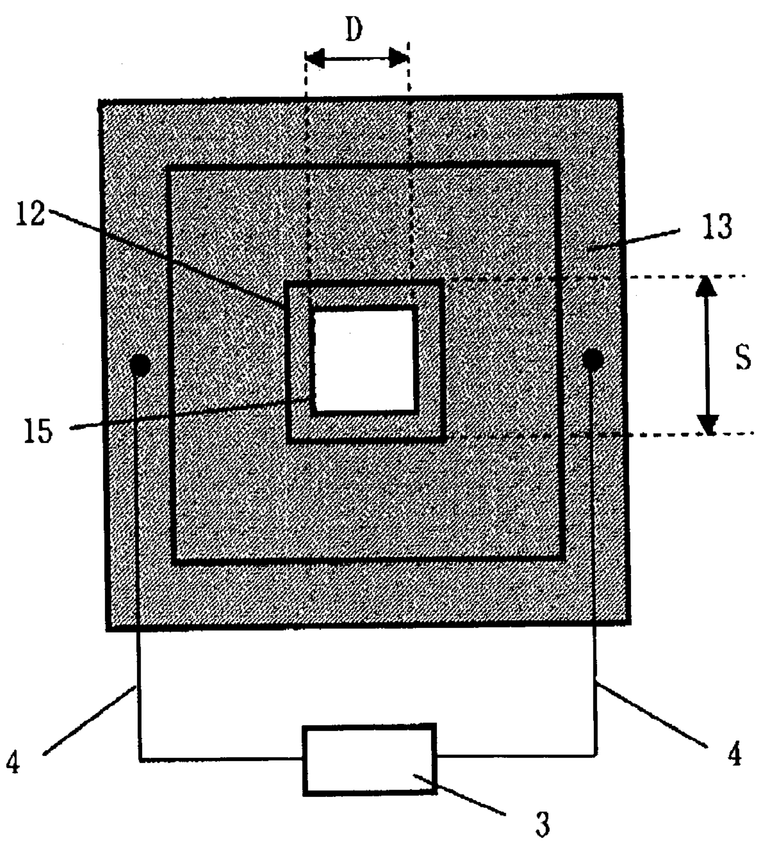
FIG. 2 is a top view of the radiation detector according to the first embodiment.

FIG. 2 is a top view of the radiation detector. With respect to the position relationship between an opening 15 of the collimator 13 and the detection area 12, the opening diameter D of the collimator 13 is slightly smaller than the size S of the detection area.

Figure 3A:
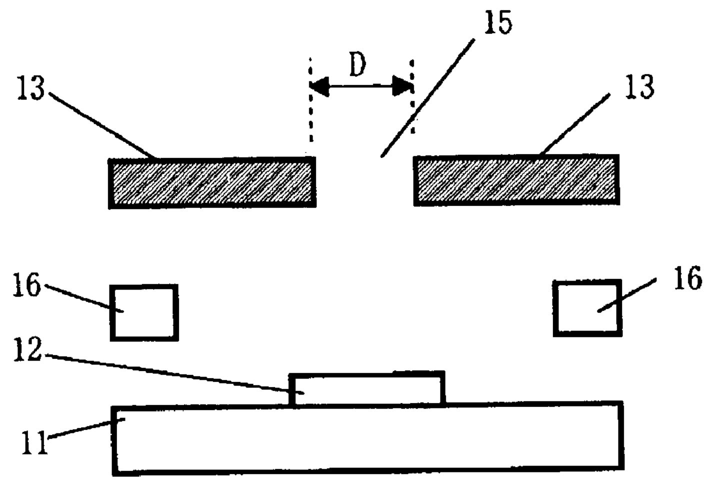
FIGS. 3A–3B are diagrams showing a procedure of making the radiation detector according to the first embodiment.

FIG. 3 shows a procedure of making the radiation detector. In FIG. 3A, the collimator 13, the spacer 16, and the board 11 constituting the radiation detector, which are prepared independently, are shown. As a material for the collimator, a material that absorbs radiation to be an object of detection is used. The thickness thereof is adjusted according to the absorption coefficient thereof. For an X-ray detector, a metallic materials such as Au, Pt, Pb, Cu, Al, Sn, Si is used. A light transmitting material made mostly from glass or sapphire can also be used for the collimator. As a material for the spacer, a material processible for a small and uniform thickness such as Si is used.

Figure 3B:
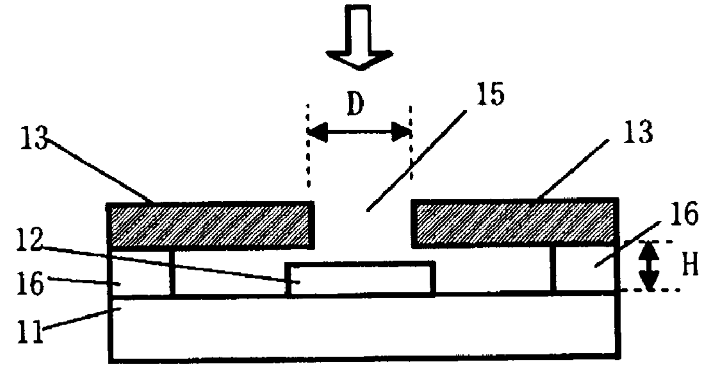

FIG. 3B shows that the collimator 13 and the spacer 16 are bonded, the spacer 16 and the board 11 are bonded, and thus a radiation detector integrated with the collimator is formed. An adhesive such as an epoxy resin or varnish is used for bonding. Alternatively, the radiation detector is formed on a Si substrate, borosilicate glass (PYREX glass) is used for the collimator, thereby allowing bonding by anodic bonding. In anodic bonding, the spacer of borosilicate glass is sandwiched between the Si substrate and the collimator, a temperature and a load are applied thereto, and they are directly bonded by applying a positive potential to Si material without using an adhesive.

The radiation detector and the collimator can be integrated, and a Si substrate and a glass substrate can be used, which makes it possible to arrange the opening of the collimator and the detection area close to each other. Further, the alignment of the opening and the detection area becomes easier, and thus the opening diameter can become closer to the size of the detection area. Accordingly, the solid angle determined by the opening diameter of the collimator and the distance between the opening and the detection area can be larger, thereby achieving a high detection efficiency.

Since the alignment of the opening and the detection area is improved, radiation can accurately irradiate the detection area so that the variation in obtained signals can be decreased. Thus, a high energy resolution can be obtained.

Further, by using a light transmitting material such as glass or sapphire as the material of the collimator, an optical alignment mechanism can be employed, which further improves the alignment accuracy of the opening and the detection area. Thus, a radiation detector having a still higher energy resolution and a still higher detection efficiency can be realized.

Yet further, a manufacturing method using anodic bonding allows bonding of a number of devices arranged on a wafer and collimators formed on a wafer of the same size, giving expectations of improvement in mass productivity. In this case, a batch process of aligning the device, the spacer, and the collimator by an optical aligner, then anodic bonding, and dancing is applicable.

Second Embodiment

Figure 4:
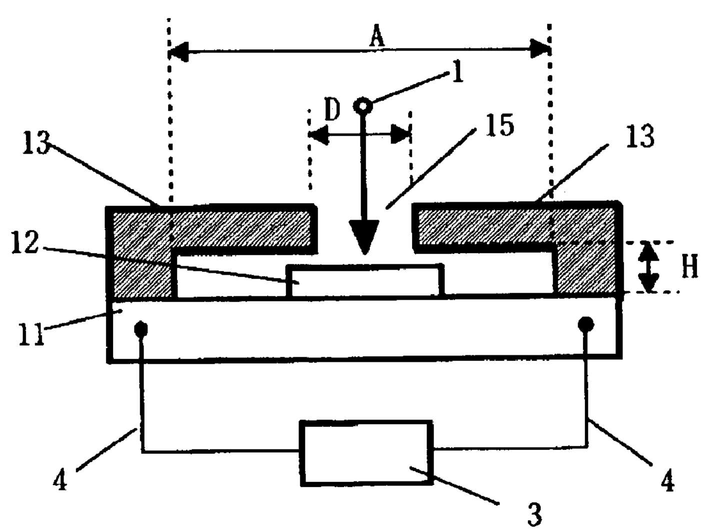
FIG. 4 is a diagram showing a radiation measurement system using a radiation detector according to a second embodiment.

FIG. 4 shows a radiation measurement system using a radiation detector according to a second embodiment of the invention. In FIG. 4, an entire board is shown as a radiation detector 11. The radiation detector 11 is connected to an external driving circuit 3 through wires 4 to be able to extract the energy of radiation 1 as an electric signal. The radiation detector 11 is provided with a detection area 12, and when radiation irradiates this region, an electric signal is obtained. Further, to prevent irradiation to a part other than the detection are 12, a collimator 13 having an opening diameter D is provided, being directly installed on the board. In this embodiment, portions of the collimator (i.e., formed in one piece with the collimator) defines connecting means for integrally connecting the collimator 13 to the energy/electricity converter.

Figure 5A:
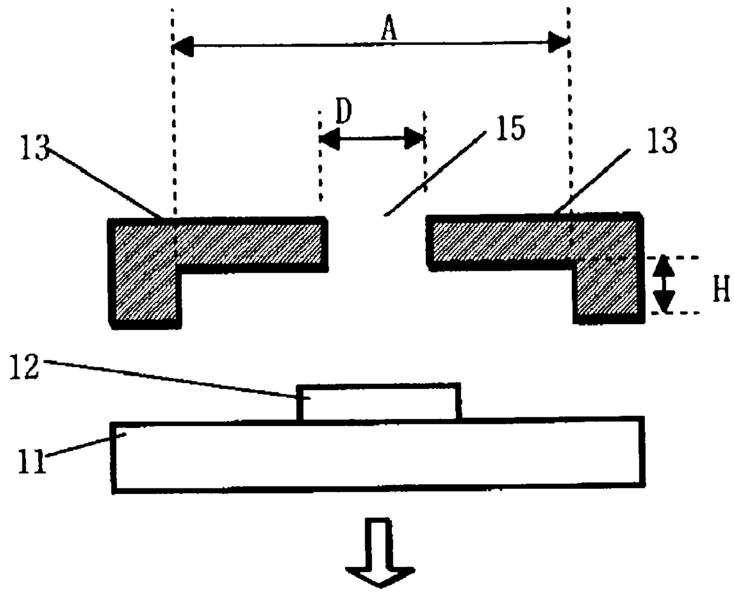
FIGS. 5A–5B are diagrams showing a procedure of making the radiation detector according to the second embodiment.

FIG. 5 shows a procedure of making the radiation detector. FIG. 5A shows the collimator 13 and the board 11 that constitutes the radiation detector, which are independently prepared. The collimator 13 is previously formed with a cavity A such that the collimator maintains a distance H from the detection 12 to avoid contact with the detection area 12. As a material of the collimator, a material that absorbs radiation to be an object of detection is used. The thickness of the collimator is adjusted according to the absorption coefficient thereof. In the case of an X-ray detector, a metallic material such as Au, Pt, Pb, Cu, Al, Sn, or Si is used. Also, light transmitting materials made mostly from glass or sapphire can be used.

Figure 5B:
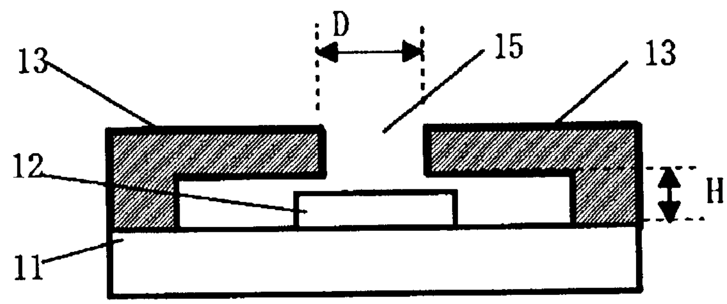

FIG. 5B shows that the collimator 13 and the board 11 are bonded to form the radiation detector integrated with the collimator. For bonding, an adhesive such as an epoxy resin or varnish is used. Or, by forming the radiation detector on a Si substrate and using borosilicate glass (PYREX glass) for the collimator 13, bonding by anodic bonding is allowed. In the anodic bonding, the radiation detector of Si and the collimator are arranged to contact with each other, a temperature and a load are applied thereto, and thus they can be directly bonded by applying a positive potential to Si material without using an adhesive.

In the present embodiment, effects same as those in the first embodiment are obtained. Further, a spacer is not required, which eases manufacturing of the radiation detector. Particularly, as the bonding is lamination of a Si substrate and a borosilicate glass substrate, bonding by anodic bonding is easy. Still further, it is possible to make the distance between the collimator and the detection area close, by which still more increase in the detection efficiency is expected.

Third Embodiment

Figure 6:
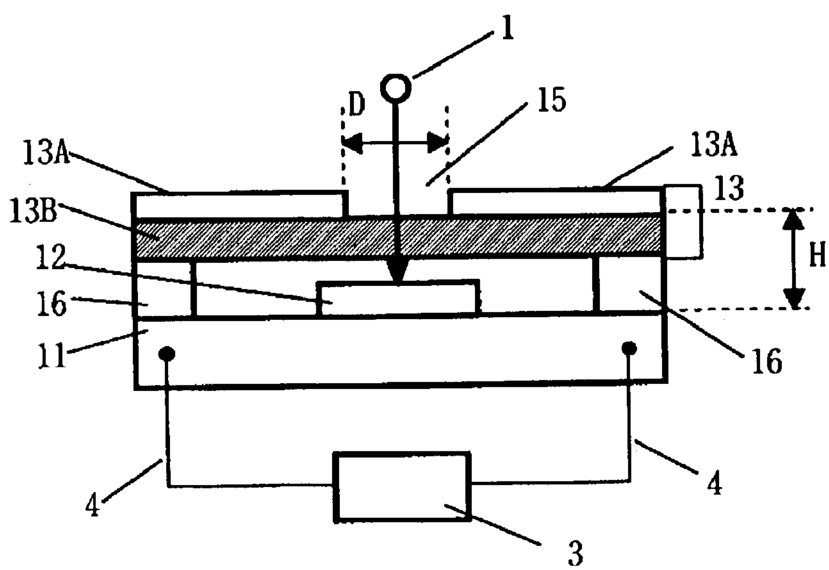
FIG. 6 is a diagram showing a radiation measurement system using a radiation detector according to a third embodiment.

FIG. 6 shows a radiation measurement system using a radiation detector according to a third embodiment of the invention. In FIG. 6, an entire board is shown as a radiation detector 11. The radiation detector 11 is connected to an external driving circuit 3 through wires 4 to be able to extract the energy of radiation 1 as an electric signal. The radiation detector 11 is provided with a detection area 12, and when radiation irradiates this region, an electric signal is obtained. Further, to prevent radiation from irradiating a part other than the detection area 12, a collimator 13 having an opening diameter D is provided such that the collimator 13 and the radiation detector 11 sandwiches the spacer 16 therebetween to maintain a distance H between the collimator 13 and the detection area 12. The collimator 13 has a bilayer structure of two kinds of materials 13A and 13B having different absorption coefficient s of radiation to be detected. The material 13A is a shielding member that shields radiation, and the material 13B is a supporting member that transmits radiation and supports the shielding member. The shielding member 13A is designed to have an absorption coefficient greater than that of the supporting member 13B. The shielding member 13A is formed with an opening that transmits radiation, and thus most of radiation is absorbed in the region other than the opening.

Figure 7A:
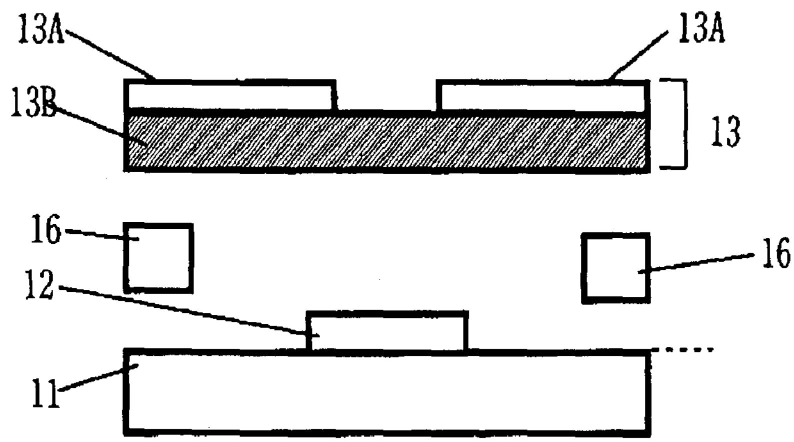
FIGS. 7A–7B are diagrams showing a procedure of making the radiation detector according to the third embodiment.

FIG. 7 shows a procedure of making the radiation detector of the present embodiment. FIG. 7A shows the collimator 13 having an opening that transmits radiation, the board 11 that constitutes the radiation detector, and the spacer 16 that maintains the distance H between the collimator 13 and the detection area 12, which are independently prepared. In the case of detecting X-rays, for the shielding member 13A, a metallic material that can well absorb X-rays, such as Au, Pt, Pb, CU, Al, Sn, or Si is used. On the other hand, for the supporting member 13B, a material that absorbs radiation less than the shielding member 13A, such as glass, sapphire, or a polymer material is used. The lower the absorption coefficient of the supporting member 13B is, the thicker the supporting member 13B can be, and thus a robust collimator can be formed. Regarding the method of making the collimator 13, in addition to lamination of the shielding member 13A and the supporting member 13B, the shielding member 13A can be formed on the supporting member 13B by a film forming method such as sputtering or vapor deposition.

For forming the opening of the collimator, there is a method that does not deposit a material constituting the shielding member 13A to the opening, using a mask. Further, forming the bilayer structure previously, the material constituting the shielding member 13A can be removed by a method such as sputter etching, ion beam etching, or focused ion beam (FIB) etching, using a mask.

A material, Si for example, processible for a small and uniform thickness is used for the spacer.

Figure 7B:
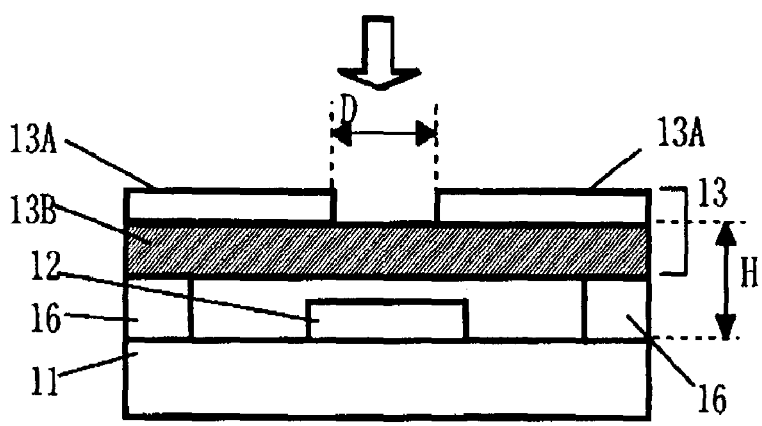

FIG. 7B shows the collimator 13, the spacer 16, and the radiation detector after bonding the spacer 16 and the board 11. An adhesive such as an epoxy resin or varnish is used for bonding. Or, the radiation detector 11 is formed on a Si substrate, borosilicate glass (PYREX glass) is used for the spacer 16, and another Si substrate is used for the collimator 13. The spacer 16 is sandwiched between the Si substrates, a temperature and a load are applied thereto, and they are directly bonded by anodic bonding in which a positive potential is applied to Si material.

It is difficult to accurately form the opening of a collimator having a large thickness. However, strength of a certain level is required for a collimator. In the present embodiment, a material having high transmittability forms the supporting member 13B, and a material having high absorbability constitutes the shielding member 13A thereon. The thickness of the supporting material 13B can be made larger, and the thickness of the shielding member 13A can be made smaller. With respect to forming the opening, a part of only the thinner shielding member 13A is to be removed. Thus, it is possible to form a collimator allowing easy forming of the opening.

Fourth Embodiment

Figure 8A:
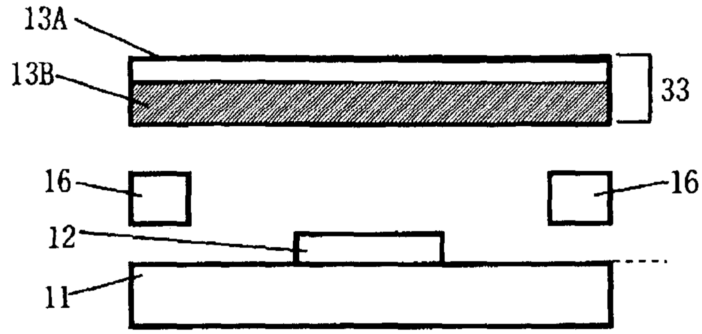
FIGS. 8A–8C are diagrams showing a procedure of making a radiation detector according to a fourth embodiment.

FIG. 8 shows a procedure of making a radiation detector according to a fourth embodiment of the invention. Although the device configuration is the same as in the third embodiment, the procedure of making the radiation detector is different. FIG. 8A shows a collimator 33 before forming an opening, a board 11 that constitutes the radiation detector, and a spacer 16 to maintain the distance H between the detection area 12 and the collimator 13, which are prepared independently. The collimator 33 has a bilayer structure of two different kinds of materials, a material 13A and a material 13B which have different absorption coefficient s of radiation to be detected.

Figure 8B:
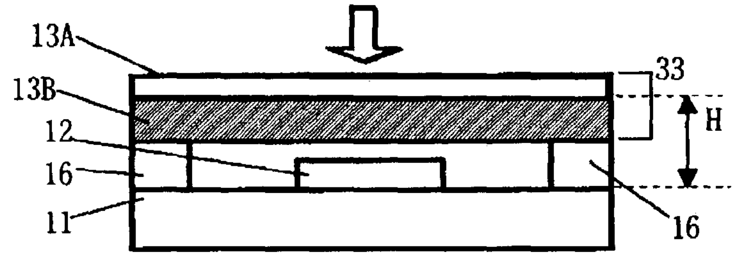

FIG. 8B shows a bonding process of bonding the collimator 33 and the spacer 16 and bonding the spacer 16 and the board 11. An adhesive such as an epoxy resin or varnish is used for bonding. Or, the radiation detector 11 is formed on a Si substrate, borosilicate glass (PYREX glass) is used for the spacer 16, and another Si substrate is used for the collimator 13. The spacer 16 is sandwiched between the Si substrates, a temperature and a load are applied thereto, and they are directly bonded by anodic bonding in which a positive potential is applied to the Si substrates without using an adhesive.

Figure 8C:
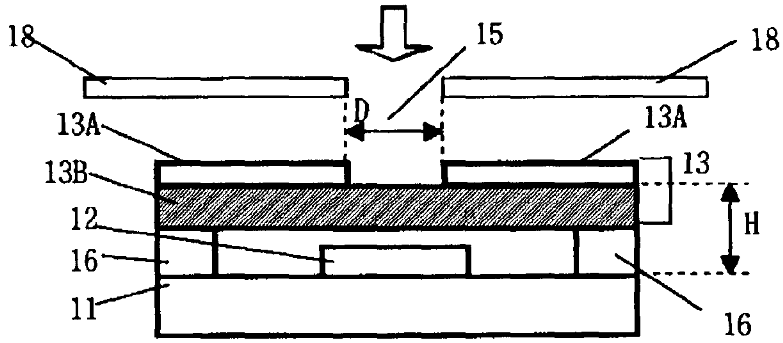

FIG. 8C shows a process of forming the opening of the collimator. The opening is formed by removing a part of the shielding member 13A, which has a greater absorption coefficient. The removal can be carried out by a method such as sputter etching or ion beam etching, using a mask 18. Further, by focused ion beam (FIB) etching, the opening can be formed without a mask.

According to the present embodiment, a robust collimator allowing easy forming of an opening can be formed, and in addition, because the alignment of the opening of the collimator and the detection area is carried out after bonding of the board and the collimator, the accuracy of the alignment is improved. Thus, a still higher energy resolution and a still higher detection efficiency are realized.

Fifth Embodiment

Figure 9:
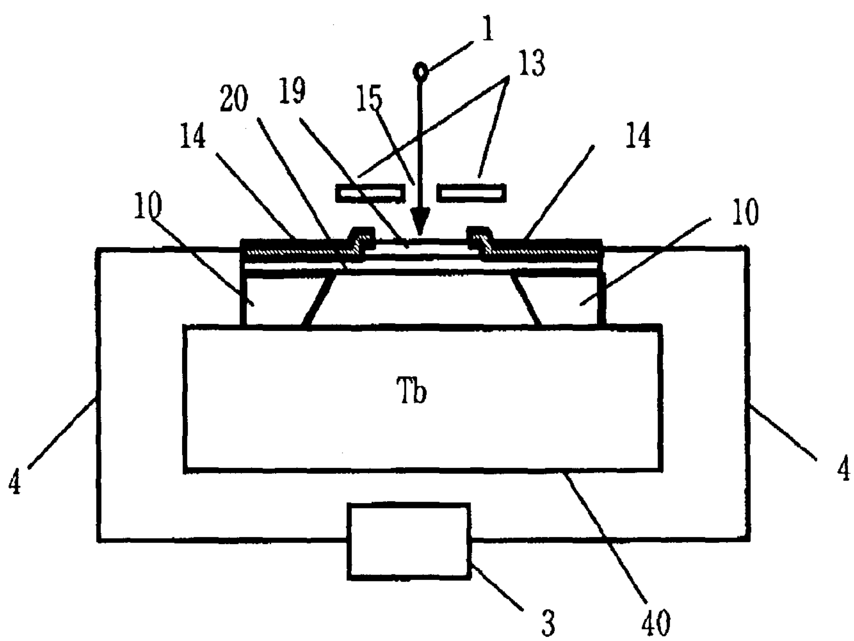
FIG. 9 is a block diagram showing a radiation measurement system using a radiation detector according to a fifth embodiment of the invention.
Figure 10A:
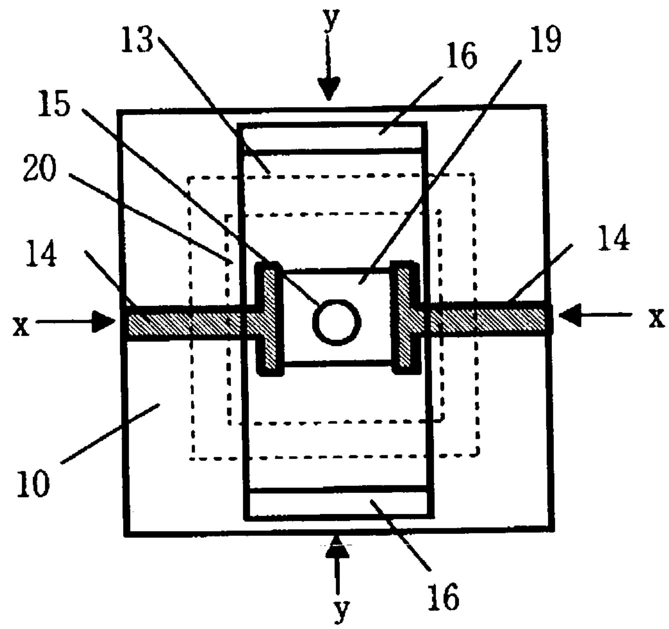
FIG. 10A is a plan structural view of a radiation detector using a superconducting transition edge sensor (TES).
Figure 10B:
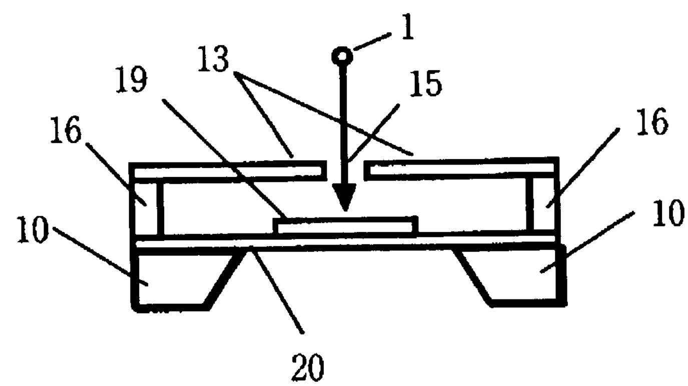
FIG. 10B is a cross-sectional structural view of the radiation detector using a superconducting transition edge sensor (TES).

FIG. 9 shows a radiation measurement system using a radiation detector according to a fifth embodiment of the invention. In the present embodiment, a superconducting transition edge sensor (TES) is used as a radiation detector. FIG. 10A is a top structural view of the superconducting transition edge sensor, and FIG. 10B is a cross-sectional structural view thereof. FIG. 9 is a cross-sectional view of the superconducting transition edge sensor taken along line x–x' of FIG. 10A, and FIG. 10B is a cross-sectional view taken along line y–y'.

The superconducting transition edge sensor is arranged on a board 10, absorbs radiation, converts energy into heat, and is provided with a resistor 19, on a thin film membrane 20, that functions as a thermal converter measuring the temperature Tt thereof. To the resistor 19, electrodes 14 are connected for supplying a current or voltage and reading out the resistance value thereof. The thin film membrane 20 has a structure with a membrane thinner than that of the board, and functions as a thermal link having a thermal conductance between the resistor 19 and a heat sink. Generally, Si is used for the board, and Si oxide or Si nitride is used for the thin membrane 20 with a thickness of approximately 1 $\mu$m.

To prevent irradiation to a part other than the resistor, which is the detection area of the superconducting transition edge sensor, a collimator 13 having an opening diameter D is provided. The collimator 13 is installed on the board forming a radiation detector 11 such that the collimator and the membrane sandwich therebetween a spacer 16 for maintaining the distance H between the collimator 13 and the detection area 12. The collimator 13 is supported on the board 10, which is the heat sink, such that the collimator is thermally insulated from the membrane.

Figure 11:
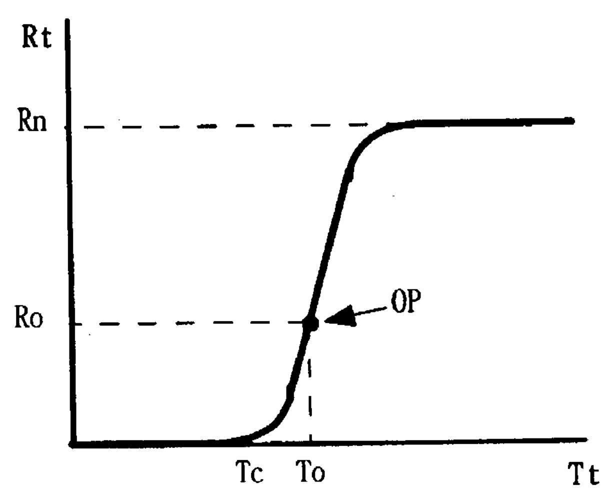
FIG. 11 is a graph showing the temperature-resistance characteristic of the superconducting transition edge sensor (TES).

The resistor 19 is a superconductor itself or constructed by a bilayer structure having a superconductor and a normal conductor. The resistor 19 of which the resistance value is denoted by Rt has a superconducting state, a normal conducting state, and an intermediate transition state, depending on a temperature Tt, of which the relationship is represented by a resistance-temperature (R-T) curve shown in FIG. 11. The resistor turns into the superconducting state at or below the temperature Tc, and the resistance value becomes zero.

The superconducting transition edge sensor is installed on a coldhead 40 cooled down to a temperature Tb (<Tc) at which the resistor turns into the superconducting state. Heat (Joule heat) that is generated by a power supplied to the resistor 19 maintains the temperature of the resistor in the intermediate transition state. In case that x-rays irradiate the resistor at an operating point OP (operating temperature To), the temperature Tt rises and the resistance value Rt changes. An external driving circuit 3 reads a change in the resistance value, and thus the energy of the incident radiation is obtained.

Thermal diffusion in the resistor is position-dependent. Therefore, depending on the irradiation position of radiation, the waveforms of obtained electric signals vary. Generally, in a radiation detector, energy is obtained by the peak value of the waveform of a pulse by radiation. Therefore, it is necessary to fix the irradiation position or make the thermal diffusion processes at irradiation positions the same. For example, the thermal diffusion at the center of the resistor and that at an edge thereof are apparently different from each other, thereby different waveforms being detected.

As the radiation detector can be integrated with the collimator, and further, Si and glass substrates can be used, it is possible to make the opening of the collimator and the detection area close. Also, the alignment of the opening and the detection area is easier to be carried out, and the opening diameter can be made close to the size of the detection area. Thus, the solid angle determined by the opening diameter of the collimator and the distance between the opening and the detection area can be made larger, by which a high detection efficiency can be obtained.

Since the accuracy of the alignment of the opening and the detection area is improved, radiation can accurately irradiate the detection area, thus restricting the variation in obtained signals. In addition to low background noise characteristic of superconducting transition sensors, restriction of variation in detection signals due to radiation position dependency implements a radiation detector having an extremely high energy resolution and SN.

The collimator 13 is supported on the board 10, which is a heat sink, so that the thermal energy that the collimator 13 absorbs does not have an effect on the resistor and is quickly exhausted to the heat sink.

Sixth Embodiment

Figure 12A:
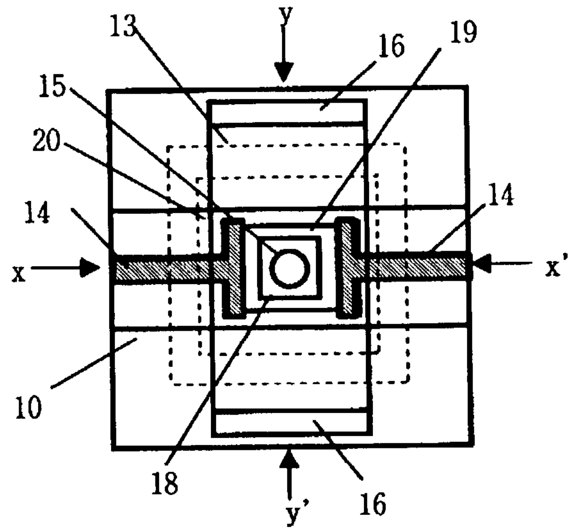
FIG. 12A is a plan structural view of a radiation detector according to a sixth embodiment.
Figure 12B:
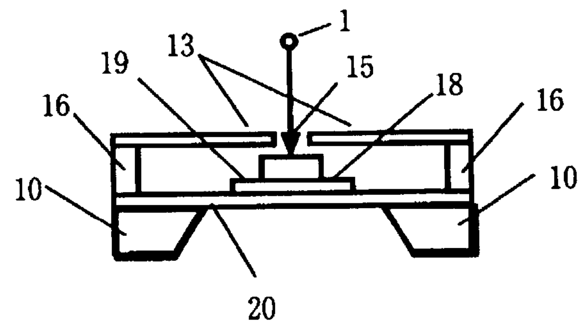
FIG. 12B is a cross-sectional structural view of the radiation detector according to the sixth embodiment.
Figure 13:
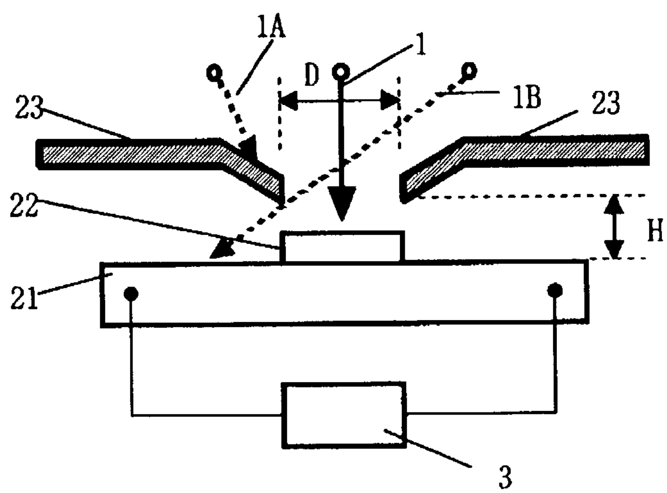
FIG. 13 is a diagram showing a radiation measurement system using a radiation detector according to the related art.

FIGS. 12A and 12B show a radiation detector according to a sixth embodiment of the invention. Also in the present embodiment, a superconducting transition edge sensor is used for the radiation detector. In a superconducting transition edge sensor, sometimes, an absorber 18 is provided on a resistor 19 to increase the probability of absorption of radiation energy. FIG. 12A is a plan structural view of the radiation detector constituted by the superconducting transition edge sensor having the absorber, and FIG. 12B is a cross-sectional structural view thereof. The absorber 18 has a function to absorb radiation, convert the energy into heat, and transfer the heat to the resistor. In this case, the absorber 18 is the detection area.

Although the probability of absorption is small, if apart, the body of the resistor 19 for example, other than the absorber is irradiated, signals having different waveforms from those of signals absorbed by the absorber 18 get generated. A collimator prevents these signals. According to the present embodiment, a higher detection probability is achieved, and a radiation detector having a higher energy resolution and a higher detection efficiency can be implemented.

EFFECTS OF THE INVENTION

The invention is embodied as described above, having the effects described below.

In a radiation detector comprised of an energy/electricity converter including a radiation detector formed on a board, and electrodes for connection to an external driving circuit, a collimator that is a shielding plate formed with an opening to transmit radiation that irradiates the detection area is installed on the same board so that the radiation detector is integrated with the collimator. Further, Si and glass substrates can be used. Thus, the opening of the collimator and the detection area can be made closer. Also, the alignment of the opening and the detection area becomes easier, making it possible to make the opening diameter closer to the size of the detection area. Thus, the solid angle determined by the opening diameter of the collimator and the distance between the opening and the detection area can be made larger, which achieves a high detection efficiency.

As the accuracy of the alignment of the opening and the detection area improves, radiation can accurately irradiate the detection area, thereby making the variation in obtained signals smaller. Thus, a high energy resolution can be obtained.

By using a light transmitting material such as glass or sapphire for the material of the collimator, an optical alignment mechanism can be employed to improve the accuracy of the alignment of the opening and the detection area still more. Thus, a radiation detector having a still higher energy resolution and a still higher detection efficiency is implemented.

The radiation detector is formed on a Si substrate, borosilicate glass is used for a spacer, and another Si substrate is used for the collimator, thereby allowing bonding by anodic bonding. A manufacturing method using anodic bonding allows bonding of a number of devices arranged on a wafer and collimators formed on a wafer of the same size, giving expectations of improvement in mass productivity.

Further, a cavity that maintains a certain distance between the board and the collimator is formed in the collimator so that the spacer in not necessary, which allows easier manufacturing. Particularly, anodic bonding that is lamination of a Si substrate and borosilicate glass becomes easier. Accordingly, the distance between the collimator and the detection area can be made still closer, which gives the expectation of further increase in detection efficiency.

The collimator has a bilayer structure of two kinds of materials having different absorption coefficient s of radiation to be detected, wherein a material having a lower absorption coefficient is fixed on a board as a supporting member, and a material having a higher absorption coefficient is formed with an opening that transmits radiation. Accordingly, a robust collimator allowing easy forming of an opening can be formed. In addition, as the alignment of the opening of the collimator and the detection area is carried out after bonding of the board and the collimator. Accordingly, the accuracy of the alignment can be improved. Thus, a still higher energy resolution and a still higher detection efficiency can be achieved.

Further, after bonding the radiation detector and the collimator, the opening can be formed aligning it with the detection area, which makes the alignment of the opening and the detection area easier and more accurate. Particularly, focused ion beam (FIB) etching allows forming of the opening without a mask.

The energy/electricity converter is a superconducting transition edge sensor (TES) that is formed on the board, which functions as a heat sink, absorbs radiation, converts the radiation into heat, and measures a change in temperature, thereby extracting the energy of the radiation as an electric signal. The superconducting transition edge sensor (TES) is integrated with the collimator so that the accuracy in the alignment of the opening and the detection area is improved, and thereby radiation can accurately irradiate the detection area, which makes the variation in obtained signals smaller. In addition to low background noise characteristic of superconducting transition edge sensors (TES), restriction of variation in detection signals due to radiation position dependency implements a radiation detector having an extremely high energy resolution and SN.

The collimator 15 is supported on the board, which is a heat sink, so that the thermal energy absorbed by the collimator 15 does not have an effect on the resistor and is quickly exhausted to the heat sink.

By applying an absorber to the superconducting transition edge sensor (TES), a radiation detector having a high probability of detection, a high energy resolution, and a high detection efficiency can be realized.

Installation of the collimator on the radiation detector has an effect of protecting the detection area, which is particularly effective in improving reliability and operationability of a superconducting transition edge sensor (TES) having a thin film membrane, which is weak mechanically.

What is claimed is:

1. A radiation detector comprising:

an energy/electricity converter having a detection area for detecting incident radiation;

a plurality of electric signal electrodes for connecting the energy/electricity converter to an external driving circuit for driving the energy/electricity converter to convert energy of the incident radiation detected by the detection area of the energy/electricity converter into an electric signal;

a collimator integrally connected to the energy/electricity converter, the collimator having an opening for transmitting radiation to irradiate the detection area of the energy/electricity converter and portions for preventing radiation from irradiating a part of the energy/electricity converter other than the detection area; and a spacer integrally connected to the collimator and the energy/electricity converter for maintaining a preselected distance between the collimator and the detection area of the energy/electricity converter.

2. A radiation detector according to claim 1; wherein the collimator is made of a light transmitting material consisting primarily of glass or sapphire.

3. A radiation detector according to claim 1; wherein the energy/electricity converter is formed on a silicon substrate, the spacer is made of borosilicate glass, the collimator is made of silicon, and the spacer is interposed between the energy/electricity converter and the collimator; and wherein the energy/electricity converter, the collimator and the spacer form an integral structure subjected to heat and a load and bonded by anodic bonding applying a positive potential to the silicon substrate and the collimator.

4. A radiation detector according to claim 1; wherein the collimator has a bilayer structure comprised of a first material forming a support member integrally connected to the energy/electricity converter and having a first radiation absorption coefficient, and a second material having the opening for transmitting radiation and a second radiation absorption coefficient higher than the first radiation absorption coefficient.

5. A radiation detector according to claim 4; wherein the opening of the collimator is formed by focused ion beam (FIB) etching while the collimator is integrally connected to the energy/electricity converter.

6. A radiation detector according to claim 1; wherein the energy/electricity converter comprises a superconducting transition edge sensor for absorbing radiation, converting the radiation into heat, and extracting energy from the radiation as an electric signal by measuring a change in temperature thereof, the superconducting transition edge sensor being formed on a substrate defining a heat sink and comprising a thin film membrane for controlling exhaustion of the heat into the heat sink a resistor formed on the thin film membrane and having a superconducting state, a normal conducting state, and an intermediate transition state, and a plurality of electrodes for connection to the external driving circuit.

7. A radiation detector according to claim 6; wherein the superconducting transition edge sensor further comprises an absorber disposed on the resistor.

8. A radiation detector according to claim 1; wherein the spacer is interposed between and integrally connected directly to the energy/electricity converter and the collimator.

9. A radiation detector comprising:

an energy/electricity converter having a detection area for detecting incident radiation;

a plurality of electric signal electrodes for connecting the energy/electricity converter to an external driving circuit for driving the energy/electricity converter to convert energy of the incident radiation detected by the detection area of the energy/electricity converter into an electric signal; and a collimator having an opening for transmitting radiation to irradiate the detection area of the energy/electricity converter and portions for preventing radiation from irradiating a part of the energy/electricity converter other than the detection area, a portion of the collimator being integrally connected to the energy/electricity converter so that the collimator and the energy/electricity converter define a cavity within which the detection area of the energy/electricity converter is disposed at a preselected distance from the opening of the collimator.

10. A radiation detector according to claim 9; wherein the collimator is made of a light transmitting material consisting primarily of glass or sapphire.

11. A radiation detector according to claim 9; wherein the energy/electricity converter is formed on a silicon substrate, and the collimator is made of borosilicate glass; and wherein the energy/electricity converter and the collimator comprise a laminated structure subjected to heat and a load and bonded by anodic bonding applying a positive potential to the energy/electricity converter.

12. A radiation detector according to claim 9; wherein the collimator has a bilayer structure comprised of a first material forming a support member integrally connected to the energy/electricity converter and having a first radiation absorption coefficient, and a second material having the opening for transmitting radiation and a second radiation absorption coefficient higher than the first radiation absorption coefficient.

13. A radiation detector according to claim 12; wherein the opening of the collimator is formed by focused ion beam (FIB) etching while the collimator is integrally connected to the energy/electricity converter.

14. A radiation detector according to claim 9; wherein the energy/electricity converter comprises a superconducting transition edge sensor for absorbing radiation, converting the radiation into heat, and extracting energy from the radiation as an electric signal by measuring a change in temperature thereof, the superconducting transition edge sensor being formed on a substrate defining a heat sink and comprising a thin film membrane for controlling exhaustion of the heat into the heat sink, a resistor formed on the thin film membrane and having a superconducting state, a normal conducting state, and an intermediate transition state, and a plurality of electrodes for connection to the external driving circuit.

15. A radiation detector according to claim 14; wherein the superconducting transition edge sensor further comprises an absorber disposed on the resistor.

16. A radiation detector according to claim 9; wherein the collimator is integrally connected directly to the energy/electricity converter.

17. A radiation detector comprising:

an energy/electricity converter having a detection area for detecting incident radiation;

a plurality of electrodes connecting the energy/electricity converter to an external driving circuit for driving the energy/electricity converter to convert energy of the incident radiation detected by the detection area of the energy/electricity converter into an electric signal;

a collimator having an opening for transmitting radiation to irradiate the detection area of the energy/electricity converter and portions for preventing radiation from irradiating any part of the energy/electricity converter other than the detection area; and connecting means for integrally connecting the collimator to the energy/electricity converter so that the detection area of the energy/electricity converter is disposed at a preselected distance from the opening of the collimator.

18. A radiation detector according to claim 17; wherein the connecting means comprises a spacer interposed between and integrally connected directly to the energy/electricity converter and the collimator.

19. A radiation detector according to claim 18; wherein the collimator, the spacer, and the energy/electricity converter form a cavity within which the detection area is disposed.

20. A radiation detector according to claim 17; wherein the connecting means is formed in one piece with the collimator and is integrally connected directly to the energy/electricity converter.

* * * * *